United States Patent
Kirla

(10) Patent No.: US 6,574,336 B1
(45) Date of Patent: Jun. 3, 2003

(54) ECHO SUPPRESSOR AND NON-LINEAR PROCESSOR OF ECHO CANCELLER

(75) Inventor: Olli Kirla, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/194,747

(22) PCT Filed: Jun. 18, 1997

(86) PCT No.: PCT/FI97/00390

§ 371 (c)(1),
(2), (4) Date: Dec. 2, 1998

(87) PCT Pub. No.: WO97/49196

PCT Pub. Date: Dec. 24, 1997

(30) Foreign Application Priority Data

Jun. 19, 1996 (FI) .................................................. 962562

(51) Int. Cl.$^7$ .............................................. H04M 9/00
(52) U.S. Cl. ............................ 379/406.01; 379/406.14; 379/406.07
(58) Field of Search ....................... 379/406.01, 406.04, 379/406.07, 406.14

(56) References Cited

U.S. PATENT DOCUMENTS 5,526,426 A 6/1996 McLaughlin
5,561,668 A * 10/1996 Genter .................. 379/406.07
5,668,794 A * 9/1997 McCaslin et al. ...... 379/406.07
5,852,661 A * 12/1998 Chen ...................... 379/406.07

FOREIGN PATENT DOCUMENTS

| EP | 0 398 441 | 11/1990 |
| EP | 0 708 535 | 4/1996 |
| JP | 7250010 | 9/1995 |
| JP | 8037480 | 2/1996 |
| JP | 9055687 | 2/1997 |
| WO | WO 96/42142 | 12/1996 |

* cited by examiner

Primary Examiner—Forester W. Isen
Assistant Examiner—Jefferey Harold

(57) ABSTRACT

The invention relates to an acoustic echo suppressor and a non-linear processor for an echo canceller in a 4-wire data transmission network. An echo canceller is typically controlled by comparing the power levels of the near-end and far-end signals. The transfer function of an acoustic echo path is usually very non-uniform. According to the invention, the spectrum of the far-end signal is treated, before the signal power level is calculated, with a weighted filter, which models the effect of the transfer function of acoustic echo. As a result, the double talk dynamics is improved, since high-energy vowels of far-end speech, which normally cause low-energy vowels of near-end speech to be clipped in an echo suppresseor, will be attenuated.

11 Claims, 8 Drawing Sheets

ECHO SUPPRESSOR AND NON-LINEAR PROCESSOR OF ECHO CANCELLER

FIELD OF THE INVENTION

The invention relates to an echo suppressor and a non-linear processor for an echo canceller in a 4-wire data transmission network.

BACKGROUND OF THE INVENTION

In bidirectional data transmission networks, such as telephone networks, echo occurs on end-to-end connections, as the talking party's voice is reflected from certain network elements. The echo is disturbing if there is delay on the end-to-end connection. The delay is usually either propagation delay or delay caused by digital signal processing.

Echo is divided into two categories: acoustic echo between the earpiece and microphone of a telephone, and electric echo caused in the transmission systems of the transmission and reception directions of a connection.

One of the main reasons behind electric echo is hybrid circuits (2-wire-4-wire converters) in terminal exchanges or remote subscriber stages of a fixed network. The subscriber lines of a fixed network are usually 2-wire lines for economic reasons, whereas connections between exchanges are 4-wire connections.

In this application, the end of a transmission connection to which the talking party's own voice returns as an echo is referred to as the far end, whereas the end of the connection from which the echo is reflected back is referred to as the near end.

An echo canceller or an echo suppressor has conventionally been used to obviate problems caused by echo. An echo canceller is a device for processing a signal, such as a speech signal. It estimates the echo and reduces the echo by subtracting the echo estimate from a signal returning from the echo path (from the near end). In echo estimation, the impulse response of the echo path is usually modelled by an adaptive filter. In addition, a non-linear processor (NLP) is often used in echo cancellers for removing residual echo resulting from adaptive filtering.

An echo suppressor is based on comparison between the power levels of a signal supplied to the echo path and a signal returning therefrom. If the ratio of the power level of the signal returning from the echo path to the power level of the signal supplied to the echo path is lower than a predetermined ratio, the transmission connection returning from the echo path will be disconnected, whereby the echo is not allowed to pass through. Otherwise it is interpreted that either near-end speech or double talk (simultaneous near-end and far-end speech) is in question, in which case the connection naturally cannot be disconnected. The non-linear processor (NLP) or center clipper used for eliminating residual echo in echo cancellers is also a certain kind of echo suppressor.

At present, mainly echo cancellers are used for eliminating echo, since echo suppressors cause the following problems. As the reference ratio for the signals of the near and far end must be selected according to the worst echo situation (usually −6 dB), low-level near-end speech does not pass through an echo suppressor during double talk. Even if the average speech levels of the near and far end were equal, near-end speech is clipped occasionally during double talk, depending on the ratio between the signal levels. Another problem is echo during double talk. During double talk, near-end speech passes through the echo suppressor, and so does echo of far-end speech when summed to the near-end speech. The echo of double talk can be reduced by attenuating the near-end signal and possibly even the far-end signal in the echo suppressor during double talk. However, the attenuation cannot be too high, since it has a disturbing "pumping" effect on the strength of the speech.

Although echo cancellers are technically better than echo suppressors, there are situations in which it is justified to use an echo suppressor. In practice, the adaptive filter of an echo canceller should be implemented digitally, which may be too expensive in a purely analogue data transmission system, particularly in terminals. Even in digital data transmission systems, the adaptive filter requires either a specific ASIC or a signal processor, the prices and current consumption of which may be too high for portable terminals, for example.

It is justifiable to use an echo suppressor in a data transmission network, i.e. not in a terminal, if the adaptive filter of an echo canceller is not sufficiently efficient. An adaptive filter removes echo poorly if the echo path is non-linear, i.e. if the non-linear distortion ratio of returning echo is poor. Non-linearity is caused, for instance, by speech coding of low transmission rate. Speech coding can be used on both fixed and wireless transmission connections.

BRIEF DESCRIPTION OF THE INVENTION

The object of the present invention is to improve the double talk dynamics of an echo suppressor.

The invention relates to an echo suppressor for eliminating acoustic echo, said echo suppressor comprising
  means for determining properties of far-end and near-end signals,
  means for enabling or disabling transmission of a near-end signal to the far end, depending on said properties of the far end and near end. The echo suppressor is characterized in that it further comprises
  means for treating the spectrum of a far-end signal, before said properties are determined, in a manner which models the effect of the amplitude response of the transfer function of acoustic echo.

The invention also relates to a non-linear processor for an echo canceller, comprising
  means for determining signal power levels for the far end and near end,
  means for activating or deactivating the non-linear processor according to the properties of the far-end and near-end signals. The non-linear processor is characterized in that it further comprises
  means for treating the spectrum of a far-end signal, before said properties are determined, in a manner which models the effect of the amplitude response of the transfer function of acoustic echo on residual echo, and that
  said near-end signal power level is the power level of the residual echo of the echo canceller.

One of the properties of acoustic echo is that the amplitude response of its transfer function (the frequency response difference between the echo supplied to the echo path and the echo returning therefrom) is very uneven. Particularly the amplitude response of the acoustic connection between the earpiece and microphone of a terminal is extremely uneven in the frequency domain: the amplitude response typically comprises a peak in the frequency range of about 1.5 to 3.0 kHz. The echo return loss ERL is thus clearly a function of frequency, i.e. ERL on the echo path is considerably lower at the peak than for instance at lower frequencies.

The invention utilizes this property in the control of an echo suppressor. As stated above, the control of an echo suppressor is based on the comparison between certain properties, such as power levels, of the near-end and far-end signals. According to the invention, the spectrum of the far-end signal is treated before the signal power level is determined in a manner which models the effect of the amplitude response of the transfer function of acoustic echo. The spectrum may be treated, for example, with a weighted filter whose amplitude response in the frequency domain is optimized to substantially correspond to the amplitude response of the transfer function of acoustic echo. In other words, the weighted filter aims at modelling echo return loss ERL as a function of frequency. If the near-end signal power level is lower than the frequency weighted far-end signal power level, the near-end signal is interpreted as acoustic echo, and the signal returning from the near end is not allowed to pass through the echo suppressor. If the near-end signal power level is higher than the frequency weighted far-end signal power level, the near-end signal is interpreted either as near-end speech or as double talk, and the near-end signal is allowed to pass through the echo suppressor.

The invention improves the double talk dynamics of an echo suppressor by the following mechanism. In a conventional echo suppressor based on unweighted power level comparison, high-energy vowels from the far end clip low-energy consonants, and partly also low-level vowels, from the near end with a high probability during double talk. The weighted filter of the invention, which is typically of high-pass or band-pass type, reduces the energy of the high-energy vowels of far-end speech in relation to the low-energy consonants. This is because the energy of vowels lies mainly in frequencies below 1 kHz, whereas the energy of consonants is distributed fairly evenly over the entire speech-frequency range. The energy of vowels of a far-end signal treated with a weighted filter is thus lower than in the known echo suppressors. Vowels of near-end speech are thus not clipped, and in addition, consonants are less likely to be clipped during double talk than in the known echo suppressors. Only high-energy consonants of the far end can clip low-energy consonants of near-end speech. Since consonants are short as compared with vowels, any clipping times of consonants of near-end speech are short and hardly deteriorate the near-end talk noticeably.

BRIEF DESCRIPTION OF THE DRAWINGS

In the following, the invention will be described by means of preferred embodiments with reference to the accompanying drawings, in which.

PREFERRED EMBODIMENTS OF THE INVENTION

The present invention can be applied in any telecommunication system or terminal for controlling an acoustic echo suppressor. In order that the echo suppressor of the invention could operate appropriately, it is essential, however, that the echo path is a purely 4-wire connection: echo reflected from the near end is thus connected only acoustically, for instance from the earpiece or loudspeaker to the microphone of a terminal. Therefore the echo path must not comprise a 2-4-wire hybrid. The reason for this is that the frequency response of electric echo formed in a 2-4-wire hybrid is rather uniform.

Figure 1:
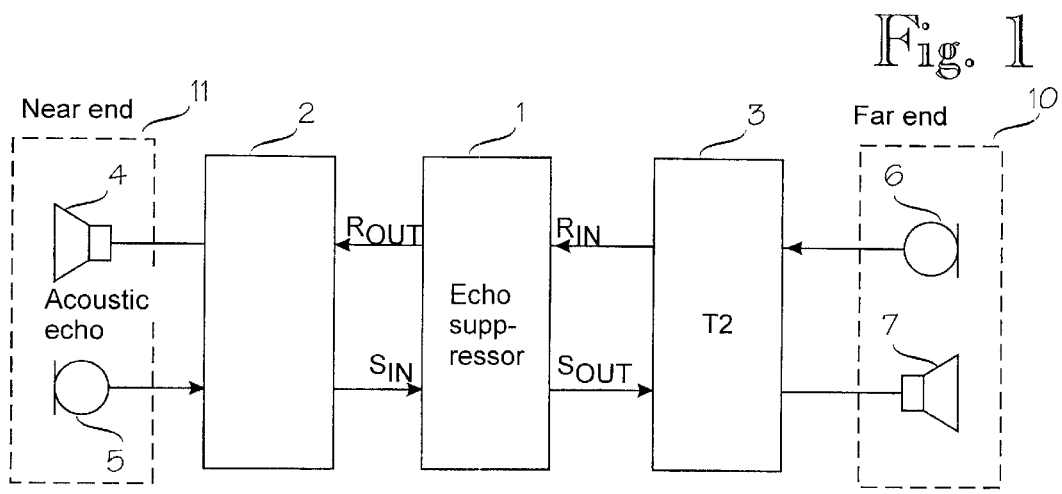
FIG. 1 is a general view of the operational environment of an echo suppressor of the invention.

FIG. 1 is a general view of the operational environment of the invention. The following abbreviations will be used for the inputs and outputs of the echo suppressor. In the transmission direction from the far end, the input is called $R_{IN}$ (Receive in) and the output $R_{OUT}$ (Receive out). In the transmission direction from the near end, the input is called $S_{IN}$ (Send in) and the output $S_{OUT}$ (Send out).

The microphone 6 of the far end converts an acoustic signal, i.e. far-end speech, into an electric signal, which is transmitted through a transmission connection T2 to an echo suppressor 1. The type of the transmission link T2 is irrelevant to the invention. It may be, for example, a 2-wire and/or a p4-wire connection; the transmission technology may be either analogue and/or digital; and the transmission connection may be physically a fixed cable connection and/or a radio path.

A signal from the far end is received at the input $R_{IN}$ of the echo suppressor and supplied from the output $R_{OUT}$ through a transmission path T1 further to the near end. The near end comprises a terminal or some other unit in which the far-end signal is converted into an acoustic speech signal either in a loudspeaker or in an earpiece 4. Part of the far-end speech is coupled acoustically from the loudspeaker or earpiece 4 to the microphone 5 of the near-end terminal as acoustic echo. A signal from the near end is supplied through the transmission connection T1 to the input $S_{IN}$ of the echo suppressor 1. From the output $S_{OUT}$ of the echo suppressor 1, a signal is transmitted through the transmission connection T2 to the far end; the transmitted signal is either the original near-end signal or comfort noise, as will be described more closely below. If the signal transmitted to the far end is the original near-end signal, it may contain the acoustic far-end echo described above; the far-end subscriber hears this echo from the earpiece or loudspeaker 7 as a disturbing echo of his own speech. The total delay of the transmission connections T1 and T2 multiplied by two determines when the speech of the far-end subscriber returns back as an echo.

According to the invention, the transmission connection T1 between the near-end terminal and the echo suppressor is always a 4-wire connection. Physically the transmission connection T1 may be a fixed cable and/or a radio path. Either analogue and/or digital transmission technology may be used.

The echo suppressor 1 may be provided in the near-end terminal, in which case the delay of the transmission connection T1 is insignificant. The transmission connection T1 thus does not comprise any actual transmission system.

If the echo suppressor is positioned apart from the terminal in the network infrastructure, the T1 comprises an actual transmission system, and the delay of the T1 may be significant. The terminal may be, for example, a terminal of a digital mobile communication system, and the echo suppressor may be provided in a speech transcoder of a mobile communication network. In this case, the T1 comprises, for example, a bidirectional radio connection, speech coding, and transmission systems between the network elements of the mobile communication network. Such a location of an echo suppressor is disclosed in the Applicant's co-pending International PCT Application WO96/42142.

Figure 2:
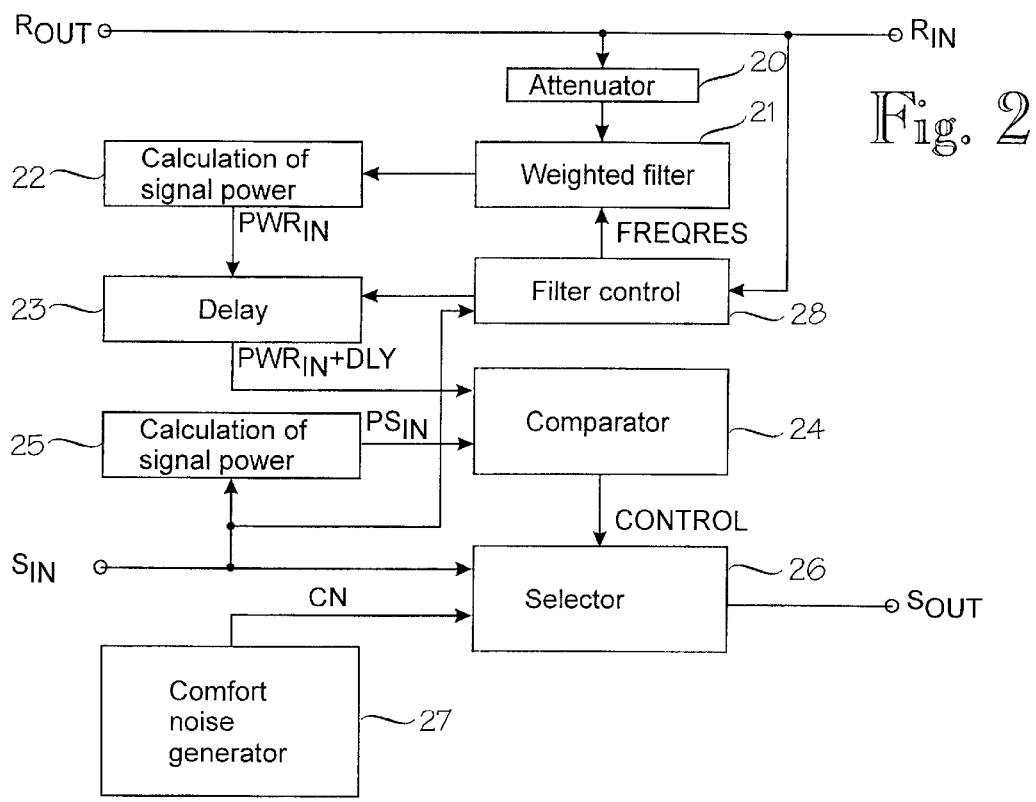
FIG. 2 is a general block diagram of the echo suppressor of the invention.
Figure 3:
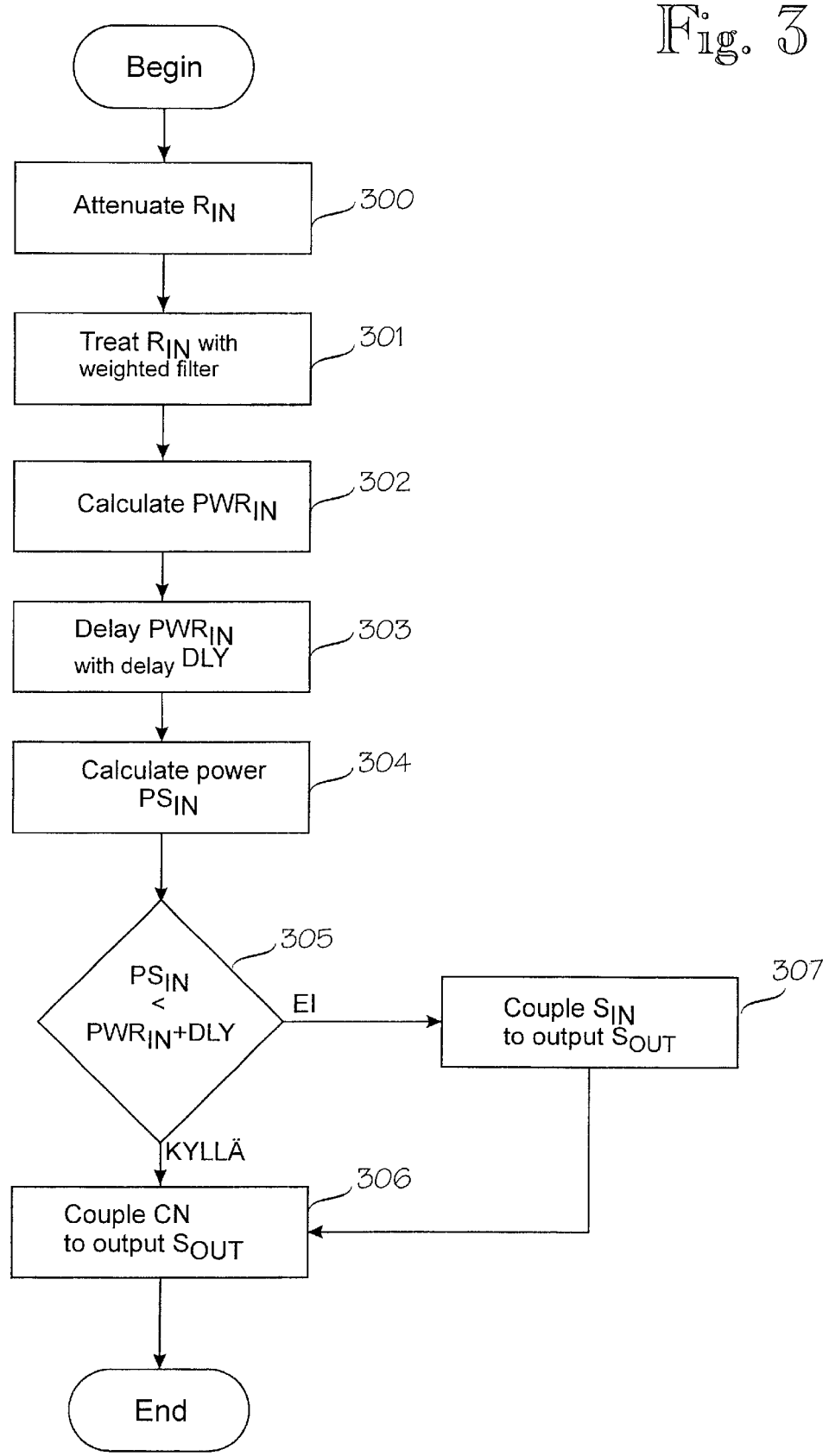
FIG. 3 is a flow chart illustrating the control of the echo suppressor of the invention.

FIG. 2 is a general block diagram of an echo suppressor of one embodiment of the invention, and FIG. 3 is a flow chart illustrating the operation of the echo suppressor. The echo suppressor 1 comprises the same ports $R_{IN}$, $R_{OUT}$, $S_{IN}$ and $S_{OUT}$, which were shown in FIG. 1. The port $R_{IN}$ is directly connected to the port $R_{OUT}$. The port $S_{IN}$ is connected to the input of a selector 26, and the port $S_{OUT}$ to the output of the selector 26. The selector 26 either enables or disables the propagation of a near-end signal to the output port $S_{OUT}$ according to a control signal received from a comparator unit 24. A comfort noise generator 27 is typically connected to the other input of the selector 26 in such a manner that the selector 26 switches either a near-end signal from the port $S_{IN}$ or the output CN of the comfort noise generator 27 to the port $S_{OUT}$ according to the control signal CONTROL received from the comparator 24 (steps 306 and 307 in FIG. 3). In its simplest form, the selector 26 may be a change-over switch.

The port $R_{IN}$ is also connected to the input of a weighted filter 21, preferably through a fixed attenuator 20. The attenuator 20 reduces the power level of the signal $R_{IN}$ to a level which is suitable for subsequent signal processing. In practice, the value of the attenuator 20 is selected according to the lowest allowable echo return loss (ERL). The weighted filter 21 treats the signal $R_{IN}$ in accordance with the invention (step 301 in FIG. 3). The output $WR_{IN}$ of the weighted filter 21 is connected to the signal power calculation unit 22, which determines the power or level of the signal received from the far end at the port $R_{IN}$ (step 302). The unit 22 may be implemented in many ways known per se. It is typically a rectifier and an integrator (analogue implementation) which integrates the signal level over a certain integration time. When the signal to be measured is digital, e.g. a PCM (pulse code modulated) signal, the unit 22 is typically implemented as digital calculation, e.g. in the signal processor. It should be noted, however, that the way the power calculation unit is implemented is irrelevant to the invention. The output $PWR_{IN}$ of the unit 22, which represents the frequency weighted power level of the far-end signal, is connected to the input of the comparator unit 24, in the embodiment of FIG. 1 through the delay 23 (step 303). In this case, the input of the comparator 24 comprises a delayed measurement result $PWR_{IN}+DLY$.

The port $S_{IN}$ is connected to the signal power calculation unit 25, which determines the power or level of the signal received from the near end o the port $S_{IN}$ (step 304). The unit 25 may be implemented in the same way as the signal power calculation unit 22. The output $PS_{IN}$ of the unit 25, which represents the power level of a near-end signal is connected to the other input of the comparator unit 24.

The comparator unit 24 compares the outputs $PWR_{IN}+DLY$ and $PS_{IN}$ of the units 22 and 25, i.e. the power levels of the far-end and near-end signals (step 305), and controls the selector 26 on the basis of the comparison (steps 306 and 307), as will be described below. In its simplest form, the comparator 26 may be a differential amplifier circuit (analogue implementation) or a binary/decimal comparator. The output CONTROL of the comparator 24 is connected to the control input of the selector 26. Although power levels of the signals $R_{IN}$ and $S_{IN}$ were used for the control in the example described above, the control may also be based on other properties of these signals, such as cross-correlation. The delay unit 23 is necessary if delay occurs on the transmission connection T1 in FIG. 1. The delay DLY of the delay unit 23 is preferably set to be approximately the same as the total delay caused by the T1 in both transmission directions (i.e. bidirectional delay); this is to ensure that the power level of a far-end signal supplied to the echo path at a specific moment is compared with the power level of the returning echo only when its own echo has propagated through the echo path. If the delay of T1 is short (e.g. the echo suppressor is provided in the terminal), the delay unit 23 is not required.

The generator 27 is employed for generating comfort noise CN, since experience has shown that a listener is greatly disturbed when the background noise behind the speech suddenly disappears. This would happen each time that the selector 26 disconnects the signal path from the port $S_{IN}$ to the port $S_{OUT}$. One way of avoiding the disturbance is to generate artificial noise, when the echo suppressor clips the actual near-end signal. This noise may be random noise or comfort noise, which tends to resemble actual background noise in the near end. Some ways of generating comfort noise are described in the Applicant's co-pending International PCT Application WO96/42142. However, the generation of noise is not relevant to the invention and may also be omitted from an echo suppressor.

As stated above, it is an essential feature of the invention is that the spectrum of the far-end signal is treated, before the power level is calculated, in a manner which simulates the effect of the amplitude response of the transfer function of an acoustic echo path. In the embodiment of FIG. 2 this is performed with a weighted filter 21. The weighted-filter 21 aims at modelling acoustic echo return loss ERL as a function of frequency. Since there is typically a peak at the frequency range of about 1.5 to 3.0 kHz in the amplitude response of the acoustic connection between the earpiece and microphone of a terminal, the echo return loss is considerably lower at the peak than for instance at lower frequencies. An optimal weighted filter is therefore typically a high-pass or band-pass filter.

The weighted filter 21 may be fixed or adaptive. The transfer function of a fixed weighted filter 21 may be, for example, the average of the transfer functions of the acoustic echoes occurring in the telephone network, whereby its amplitude response is of high-pass type. The steepness, cut-off frequency and the attenuations of the pass band and stop band are determined according to the "worst" terminal having the lowest echo return loss ERL. The terminals having the next lowest ERLs are, however, taken into account if their ERLs at certain frequencies are lower than those of the "worst" terminal. An example of implementation of a fixed weighted filter is a digital elliptic IIR (Infinite Impulse Response) high-pass filter of the third degree whose transfer function is:

$$H(z) = \frac{b_0 + b_1 z^{-1} + b_2 z^{-2} + b_3 z^{-3}}{1 + a_1 z^{-1} + a_2 z^{-2} + a_3 z^{-3}}$$

Figure 4:
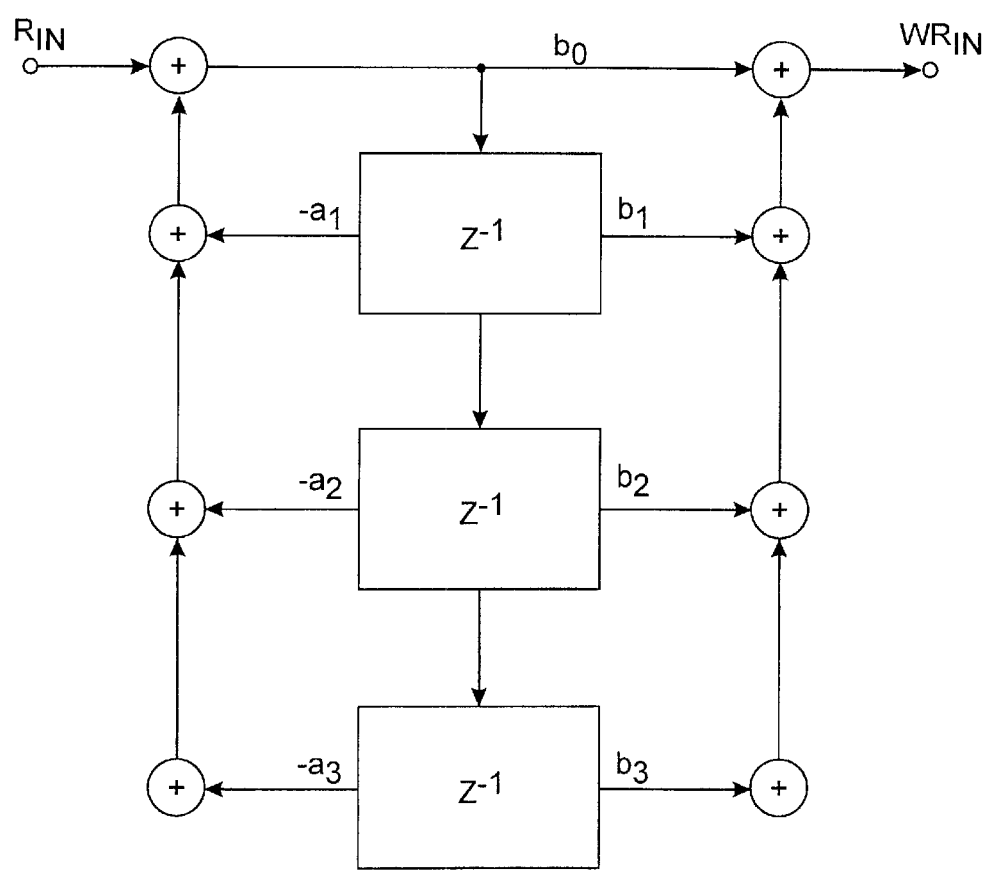
FIG. 4 shows a weighted digital filter of the invention.

FIG. 4 shows a block diagram of a direct IIR type filter which satisfies the equation given above.

For an adaptive weighted filter 21 the optimal transfer function may be obtained on a call-by-call basis. In this case, the average double talk dynamics can be further increased, since the transfer function of the weighted filter does not have to be selected according to the lowest ERL, as in the case of a fixed weighted filter.

Figure 5:
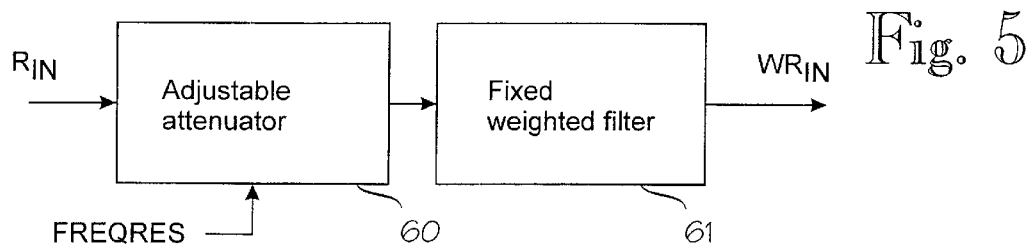
FIG. 5 shows a weighted adaptive filter of the invention.

In its simplest form, the adaptive weighted filter comprises a fixed frequency response, i.e. a fixed filter 61, and adaptive further attenuation (e.g. an adaptive attenuator 60 before the filter 61), as illustrated in FIG. 5. In this case, the adaptive attenuator 60 replaces the fixed attenuator 20. The filter 61 may be, for example, the filter of FIG. 4. The control FREQRES of the attenuator 60 is obtained from the control 28 of the filter (FIG. 2).

The best result can naturally be obtained if the weighted filter 21 is adaptive in the frequency domain. In this case, the acoustic echo path is modelled in the frequency domain, and the weighted filter 21 is adjusted to correspond to the echo path model call-specifically. The weighted filter 21 can be adjusted either once, at the beginning of the call, or continuously so that any changes in the properties of the echo path during the call are taken into account.

Both the far-end speech signal and the echo of the speech returning from the near end can be used for modelling acoustic echo. This requires means for identifying double talk and background noise in the near end. Such methods are known in echo cancelling technology. Alternatively, an echo suppressor may, for example, send a test signal through the port $R_{OUT}$ to the echo path at the beginning of a call. The acoustic echo of the test signal is received at the port $S_{IN}$. On the basis of the test signal and the received echo of the test signal, it is possible to determine the echo return loss, the transfer function of the echo path and/or the delay of the echo path according to principles well known in the art. FIG. 2 shows the control unit 28 of the adaptive weighted filter 21; the control unit 28 may perform the operations described above. When the transfer function of the acoustic echo path has been calculated/defined, the control unit 28 sets the transfer function of the weighted filter accordingly. In this case, the fixed attenuator 20 of FIG. 2 is not required. If the control unit 28 also calculates the delay of the echo path, the delay of the delay unit 23 can also be adjusted adaptively.

In digital technology, the fast Fourier transform FFT, for example, can be used for determining the frequency response difference between the near-end and far-end signals. On the basis of this, the tap coefficients of a digital weighted filter can be set to be optimal for the call in question.

Figure 6:
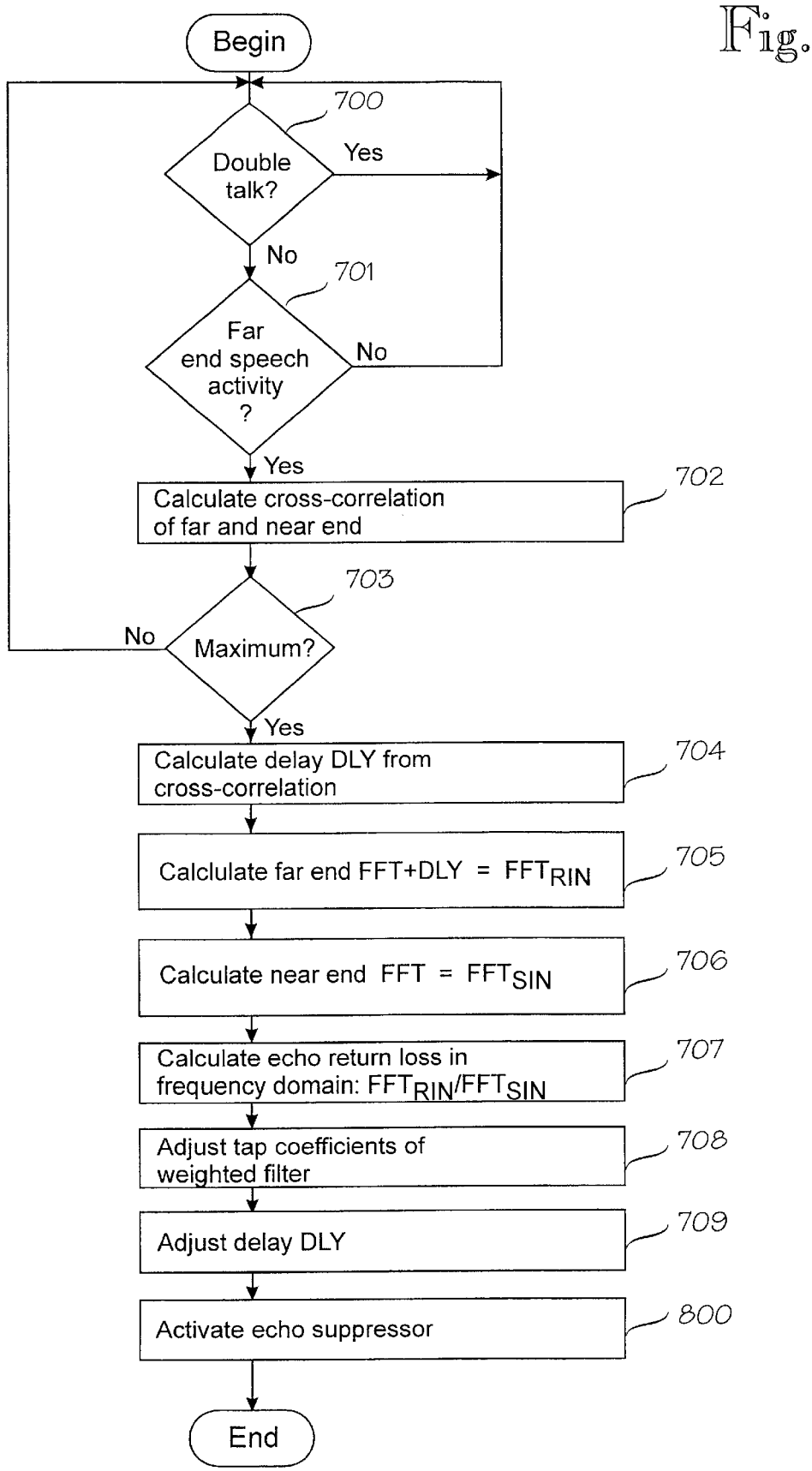
FIG. 6 is a flow chart illustrating the control of an adaptive filter, based on the fast Fourier transform (FFT)

In the flow chart of FIG. 6, it is checked at first whether double talk is occurring (step 700). If so, the echo suppressor is naturally not activated, but the process returns to the beginning. If not, step 701 is proceeded to in order to check the speech activity of the far end. If there is no speech activity, echo suppression is not needed, and the process returns to the beginning. Otherwise the cross-correlation of the far and near end is calculated in step 702, and it is checked in step 703 whether the cross-correlation contains a distinct maximum value, i.e. an echo point. If not, the process returns to the beginning. Otherwise the delay DLY of the echo path is calculated in step 704 by means of cross-correlation; the delay is also obtained from the maximum echo point. The fast Fourier transform $FFT_{RIN}$ of the far-end signal $R_{IN}$, delayed by the delay DLY, is calculated in step 705. The fast Fourier transform $FFTS_{IN}$ of the near-end signal $S_{IN}$ is calculated in step 706. In step 703, the echo return loss in the frequency domain is calculated: $FFT_{RIN}/FFT_{SIN}$. On the basis of the calculated echo return loss, the tap coefficients of the digital weighted filter 21 are adjusted in step 708, and the delay DLY of the delay member 23 is set in step 709. Thereafter the echo suppressor is activated in step 800.

Figure 7:
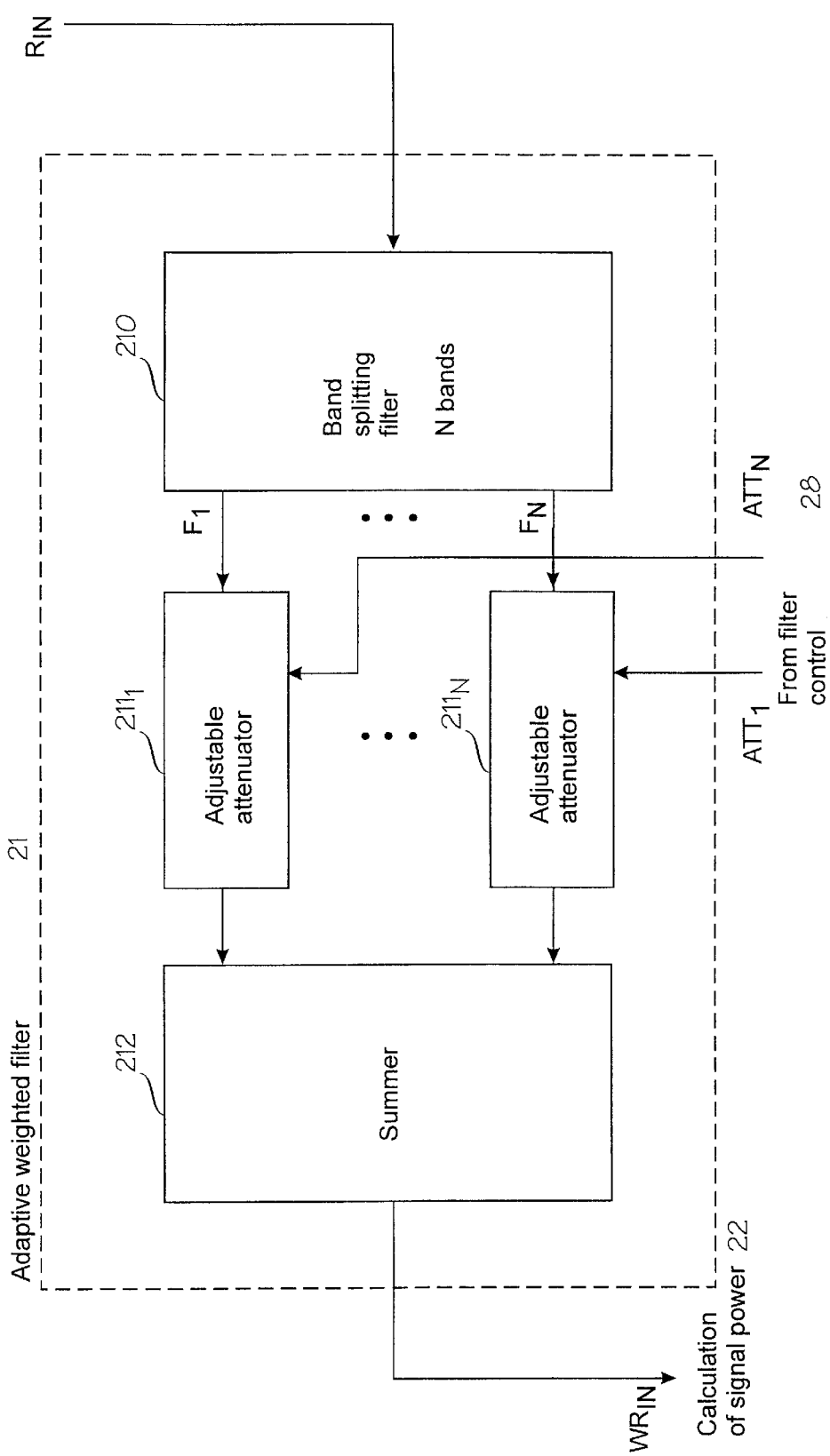
FIGS. 7 and 8 are block diagrams illustrating a weighted filter based on the bandsplitting principle, and a control unit.

FIG. 7 shows an adaptive weighted filter 21 which is based on the bandsplitting filter principle. A far-end signal $R_{IN}$ is splitted by a bandsplitting filter 210 into N frequency bands $F_1 \ldots F_N$. Each signal $F_1 \ldots F_N$ is attenuated by a separate adjustable attenuator $211_1 \ldots 211_N$, the attenuation of which is set according to the attenuation values $ATT_1 \ldots ATT_N$ obtained from the control 28 of the filter. Each sub-band $F_1 \ldots F_N$ of the signal $R_{IN}$ is thus adjusted separately according to the frequency response of the echo path. The outputs of the attenuators 211 are supplied to a summer 212, in which the sub-bands $F_1 \ldots F_N$ are summed to obtain a signal $WR_{IN}$ treated with a weighted filter. The signal $WR_{IN}$ is supplied to the signal power calculation unit 22.

Figure 8:
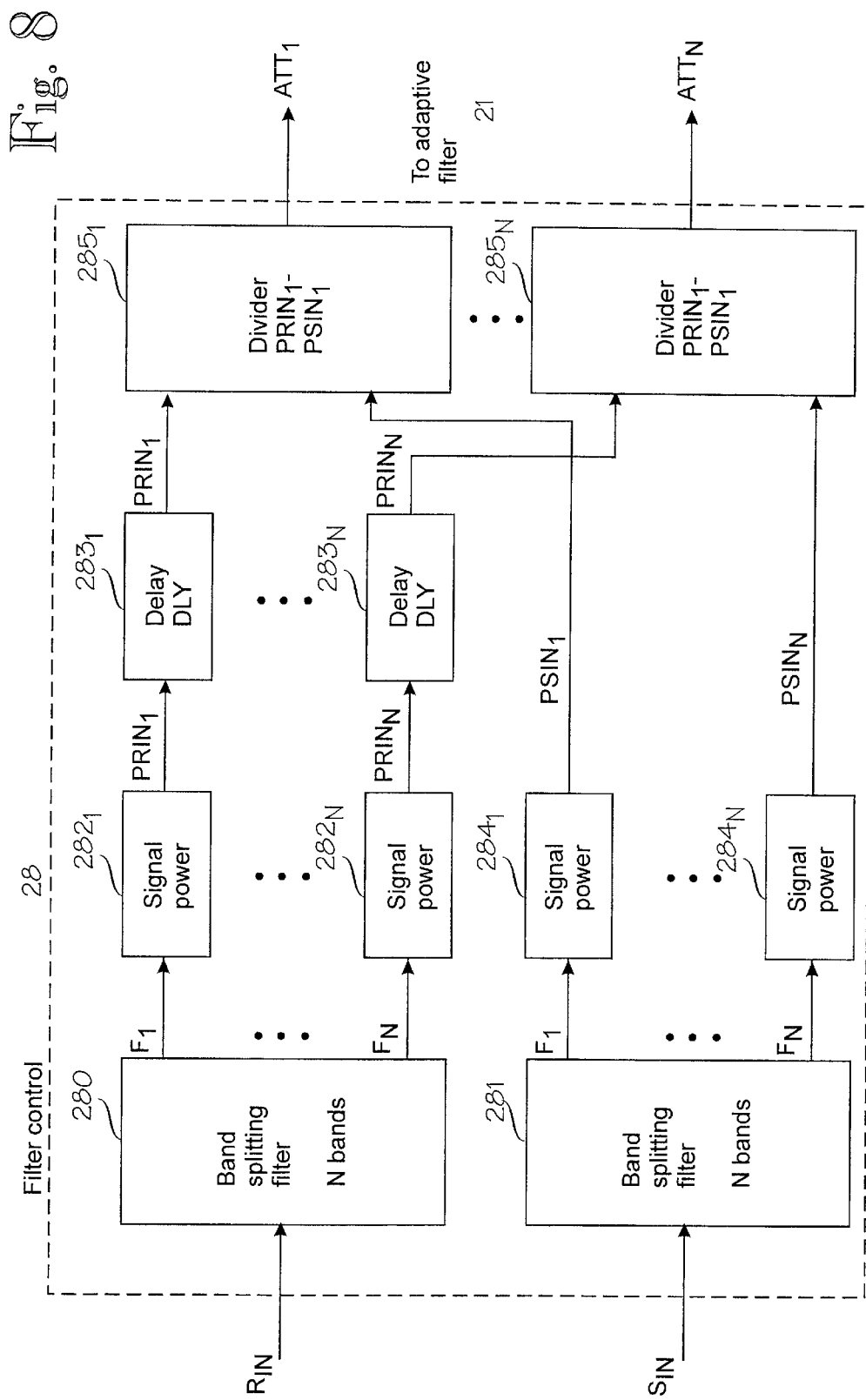

FIG. 8 illustrates the control 28 of the weighted filter 21 of FIG. 7, based on the bandsplitting filter principle.

A far-end signal $R_{IN}$ is divided by a bandsplitting filter 280 into N frequency bands $F_1 \ldots F_N$. The signal power level of each frequency band $F_1 \ldots FN$ is calculated in blocks $282_1 \ldots 282_N$, whereafter the calculated power levels are delayed by the delay DLY in delay blocks $283_1 \ldots 283_N$. From the delay units $283_1 \ldots 283_N$, the power level values $PRIN_1 \ldots PRIN_N$ are supplied to the corresponding divider units $285_1 \ldots 285_N$. In the same way, a near-end signal $S_{IN}$ is divided by a bandsplitting filter 281 into N bands $F_1 \ldots F_N$. In blocks $284_1 \ldots 284_N$, signal power levels $PSIN_1 \ldots PSIN_N$ are calculated for the frequency bands and supplied to the corresponding dividers $285_1 \ldots 285_N$. Each divider 285 calculates the corresponding far-end and near-end signal power level ratio. This ratio forms the attenuation value $ATT_1 \ldots ATT_N$, which is supplied to the corresponding adjustable attenuator $211_1 \ldots 211_N$ in the weighted filter 21.

The delay of the echo path, i.e. the echo point, may be obtained by means of the cross-correlation between the near and far-end signals, for example, as illustrated in the flow chart of FIG. 6.

The echo suppressor of the invention operates, in principle, as follows. It can be assumed that the weighted filter 21 is fixed or that it has been set, at the beginning of a call, to be optimal by modelling the echo path. A far-end signal $R_{IN}$ is weighted by the weighted filter 21, whereafter the power level of the frequency weighted far-end signal is calculated in a power calculation unit 22. The calculated power level is forwarded to a delay unit 23. The delay unit 23 delays the supply of the power level information to a comparator 24 so long that the far-end signal propagates through the port $R_{OUT}$ and the transmission connection T1 to the near-end terminal, part of it is connected acoustically from the earpiece 4 to the microphone 5, and returns as an acoustic echo to the port $S_{IN}$ of the echo suppressor 1. The power level of the signal received from the near end is calculated in a calculating unit 25 and supplied to the comparator 24 substantially at the same time that the delay circuit 23 supplies the weighted far-end signal power level. If the near-end signal power level is lower than the frequency weighted far-end signal power level, the comparator 24 interprets the near-end signal as an acoustic echo and controls a selector 26 in such a manner that a comfort noise generator 27 is connected to the output port $S_{OUT}$. In other words, the near-end signal is prevented from propagating to the output $S_{OUT}$ and replaced with comfort noise. If the near-end signal power level is higher than the frequency weighted far-end signal power level, the signal at the port $S_{IN}$ is interpreted as near-end speech or double talk, and the comparator 24 controls the selector 26 in such a manner that the near-end speech is connected from the port $S_{IN}$ to the port $S_{OUT}$.

The present invention can also be applied in an echo canceller provided with a non-linear processor (NLP). The operation of the NLP is comparable to an echo suppressor. The invention is particularly advantageous in a distributed echo cancelling solution, in which an adaptive filter is located in a terminal and an NLP in a network element. In this case, it is not possible to utilize the echo estimate of the echo canceller for calculating the far-end power level; thus a weighted filter is the only solution for modelling the amplitude response of the echo path. A distributed echo cancelling system is disclosed in the Applicant's co-pending International PCT Application W096/42142.

Figure 9:
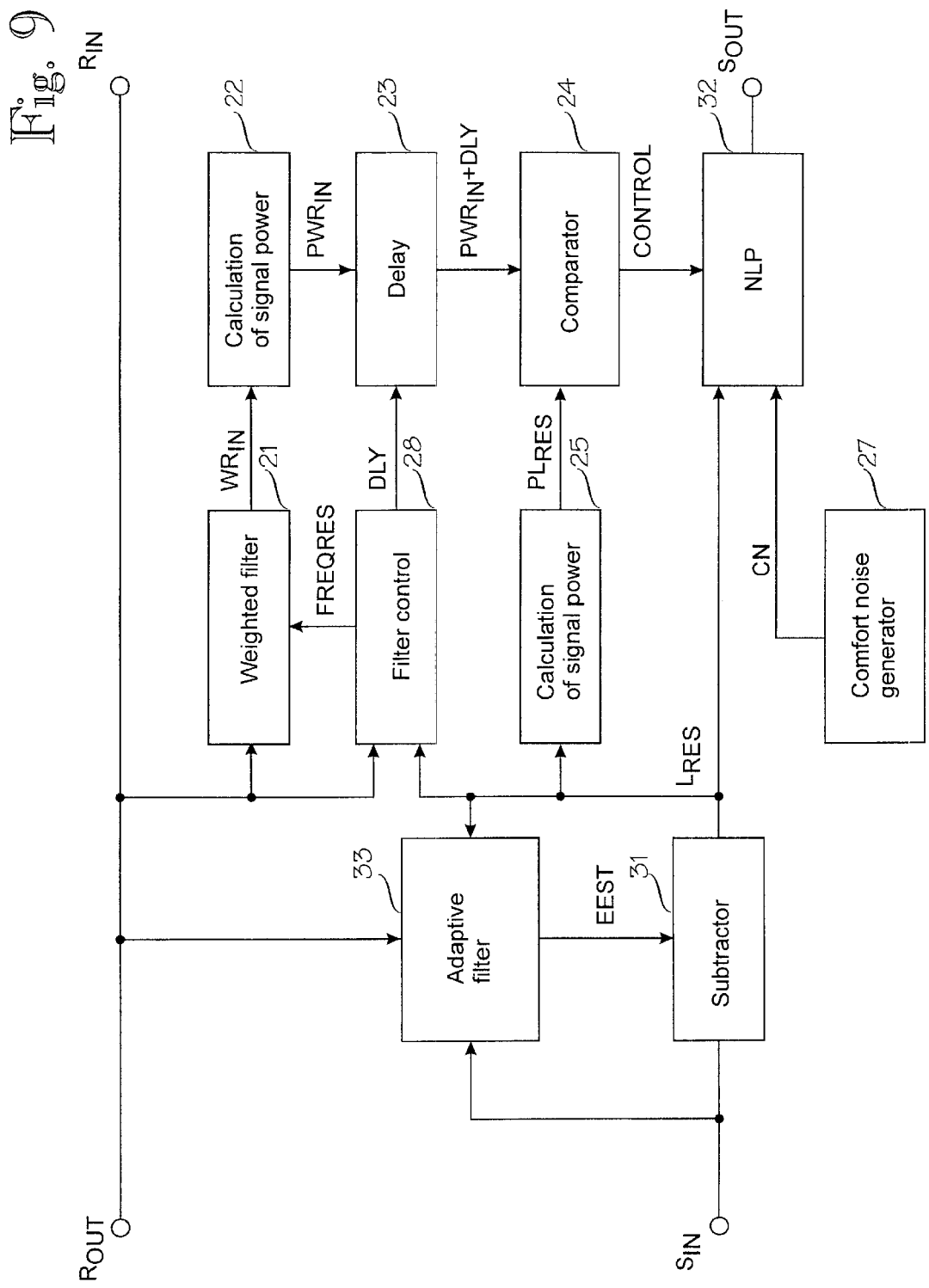
FIG. 9 shows an echo canceller in which the present invention is applied for controlling a non-linear processor.
Figure 10:
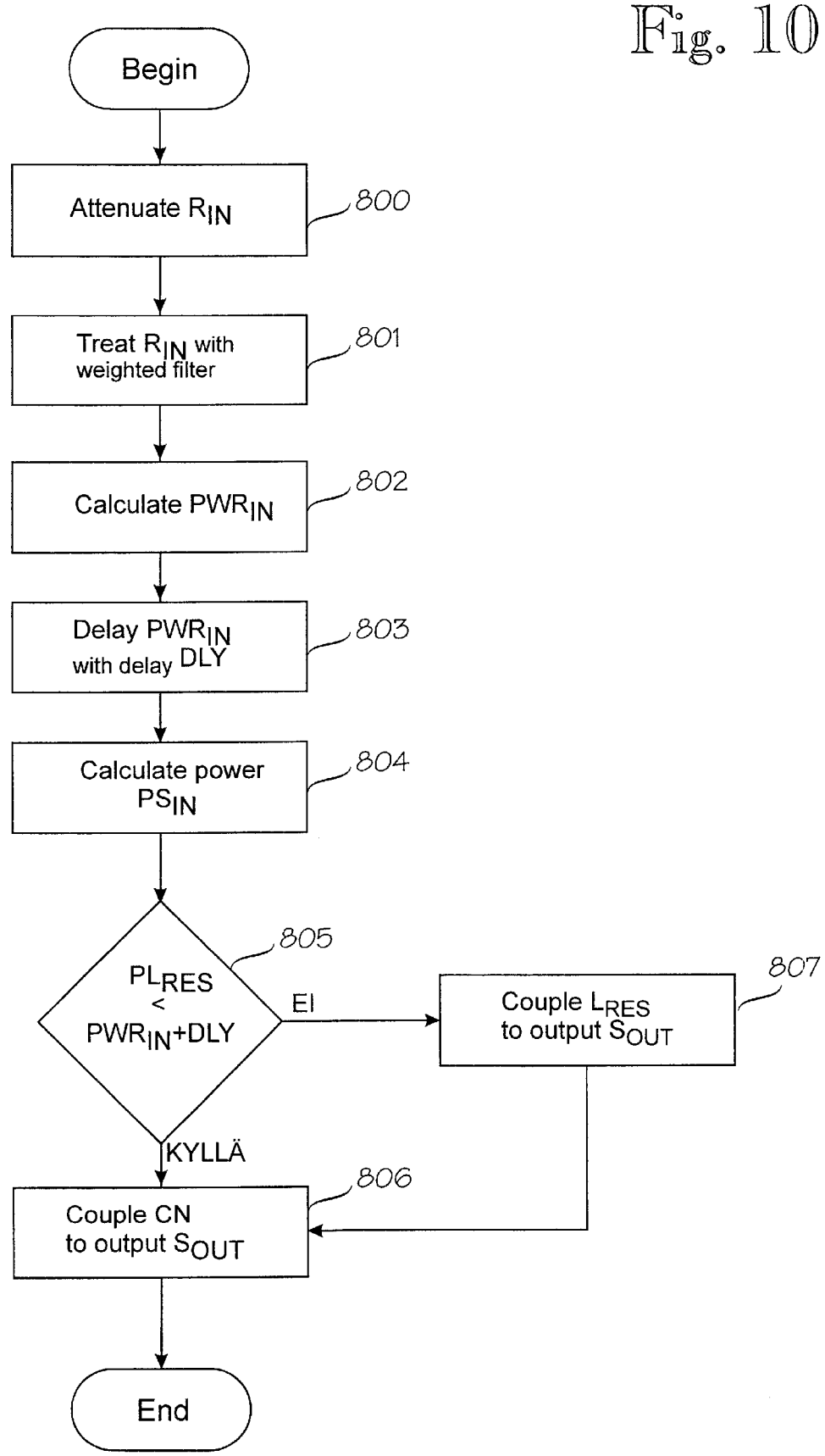
FIG. 10 is a flow chart illustrating the control of a non-linear processor in accordance with the invention.

FIG. 9 illustrates an echo canceller, and the flow chart of FIG. 10 illustrates the control of an NLP in accordance with the invention. The echo canceller comprises an adaptive digital filter 33, which on the basis of the signals $R_{OUT}$ and $S_{IN}$ forms an echo estimate EEST, which a subtractor 31 subtracts from the signal $S_{IN}$. The NLP 32 is provided after the subtractor and is controlled substantially in the same way as the selector 26 in FIG. 2. The structure and operation of units 21, 22, 23, 24, 25, 27 and 28 in FIG. 3 are substantially the same as in FIG. 2. The difference is mainly that, instead of near-end signal power level, the power calculation unit 25 calculates the power level $PL_{RES}$ of the residual echo LRES of the adaptive echo canceller. Since the power level of the echo signal is lower after the adaptive echo canceller (subtractor 31) than that of the near-end signal power level at the port $S_{IN}$, the reference ratio for the near and far-end signal power levels can be reduced without that the residual echo is allowed to pass through the NLP 32. This also improves the double talk dynamics. The double talk dynamics is also improved by the weighted filter 21 of the invention. A condition for the application of the invention in an echo canceller is, however, that the spectrum of the residual echo of the adaptive echo canceller is high-pass filtered in the frequency domain as compared with the spectrum of the far-end signal. In theory, the residual echo of an adaptive echo canceller is noise with a uniform spectrum, but in practice, the residual signal of an acoustic echo is high-pass filtered as a result of the non-linearity of the acoustic echo path and the calculation inaccuracy of the filter 33.

Although the invention has been described above with reference to specific embodiments, it will be understood, however, that the specification is only exemplary, and the embodiments described can be modified without departing from the spirit and scope of the invention as described in the appended claims.

What is claimed is:

1. An echo suppressor for eliminating acoustic echo, said echo suppressor comprising:
    means for determining properties of far-end and near-end signals,
    means for enabling or disabling transmission of a near-end signal to the far end, depending on said properties of the far end and near end, and
    means for treating the spectrum of a far-end signal, before said properties are determined, in a manner which models the effect of the amplitude response of the transfer function of acoustic echo, said means for treating the spectrum of a far-end signal comprising a single weighted filter whose amplitude response in frequency domain substantially corresponds to the amplitude response of the transfer function of the acoustic echo.

2. The echo suppressor according to claim 1, wherein said means for enabling or disabling the transmission of a near-end signal to the far end comprises:
    a selector for selecting a near-end signal or a noise signal as the signal to be transmitted to the far end, and
    control means for controlling the selector according to the signal power levels of the far end and the near end.

3. The echo suppressor according to claim 2, further comprising a noise generator for generating a noise signal.

4. The echo suppressor according to claim 2, further comprising a delay element between the control means and the means for determining the far-end signal power level, the delay of the delay element being substantially equal to the delay of the echo path.

5. The echo suppressor according to claim 1, wherein the weighted filter is fixed or adaptive.

6. The echo suppressor according to claim 1, wherein the weighted filter is a high-pass, band-pass or weighted band-splitting filter.

7. The echo suppressor according to claim 1, wherein the near-end signal contains residual echo of an echo canceller provided in the near end.

8. A non-linear processor, the non-linear processor being located in a network element in a communications network, the non-linear processor comprising:
    means for receiving a near-end signal over a transmission channel from an echo canceller located in a near-end subscriber terminal,
    means for determining signal power levels for the far-end and near-end,
    means for activating or deactivating the non-linear processor according to the signal power levels of the far-end and near-end signals, and
    a single weighted filter whose amplitude response in frequency domain substantially corresponds to the amplitude response of the transfer function of the acoustic echo for treating the spectrum of a far-end signal before properties are determined in a manner which models the effect of the amplitude response of the transfer function of the acoustic echo on residual echo, and wherein said near-end signal power level is the power level of the residual echo of the echo canceller.

9. An echo suppressor for eliminating acoustic echo, said echo suppressor comprising:
    a first port receiving a far-end signal from a far-end of a connection,
    a second port outputting the far-end signal to a near-end,
    a third port receiving a near-end signal from the near-end,
    a fourth port outputting a signal to the far-end,
    a signal switch connecting or disconnecting a signal path of the near-end signal from said third port to said fourth port,
    a first power level detector detecting a power level of the near-end signal and providing a first detection signal representing said detected power level,
    a filter having a frequency response which substantially models the effect of an amplitude response of the transfer function of an acoustic echo path between the second and third ports, said filter being operatively connected to receive said far-end signal and outputting a processed far-end signal having an amplitude response processed by said filter,
    a second power level detector operatively connected to said filter to detect a power level of said processed far-end signal and providing a second detection signal representing said detected power level, and
    a controller configured to receive said first and second detection signals and to control said signal switch on the basis of said first and second detection signals.

10. An echo suppressor for eliminating acoustic echo, said echo suppressor comprising
- a first port receiving a far-end signal from a far-end of a connection,
- a second port outputting the far-end signal to a near-end,
- a third port receiving a near-end signal from the near-end,
- a fourth port outputting a signal to the far-end,
- a signal switch connecting or disconnecting a signal path of the near-end signal from said third port to said fourth port,
- a first power level detector detecting a power level of the near-end signal and providing a first detection signal representing said detected power level,
- a filter having a frequency response which substantially models the effect of an amplitude response of the transfer function of an acoustic echo path between the second and third ports, said filter being operatively connected to receive said far-end signal and outputting a processed far-end signal having an amplitude response processed by said filter,
- a second power level detector operatively connected to said filter to detect a power level of said processed far-end signal and providing a second detection signal representing said detected power level,
- a controller configured to receive said first and second detection signals and to control said signal switch on the basis of said first and second detection signals, and
- a delay element between said second power level detector and said controller, the delay of the delay element being substantially equal to the delay of the echo path.

11. A mobile communications system, comprising:
- a mobile station configured to communicate with a mobile communications network over a radio path,
- an echo canceller in the mobile station at the near end of an echo path,
- an echo suppresser located in a network element in the mobile communications network, for eliminating an acoustic echo from a near-end signal received from the mobile station over the radio path, said echo suppressor comprising:
  - a first port receiving a far-end signal from a far-end of a connection,
  - a second port outputting the far-end signal to a near end,
  - a third port receiving a near-end signal from the near-end,
  - a fourth port outputting a signal to the far-end,
  - a signal switch connecting or disconnecting a signal path of the near-end signal from said third port to said fourth port,
  - a first power level detector detecting a power level of a near-end signal and providing a first detection signal representing said detected power level,
  - a filter having a frequency response which substantially models the effect of an amplitude response of the transfer function of an acoustic echo path between the second and third ports, said filter being operatively connected to receive said far-end signal and outputting a processed far-end signal having an amplitude response processed by said filter,
  - a second power level detector operatively connected to said filter to detect a power level of said processed far-end signal and providing a second detection signal representing said detected power level, and
  - a controller configured to receive said first and second detection signals and to control said signal switch on the basis of said first and second detection signals.

\* \* \* \* \*